W. W. GREEN.
APPARATUS FOR COLLECTING DUST AND OTHER FINE PARTICLES.
APPLICATION FILED AUG. 18, 1911.
1,035,822.  Patented Aug. 13, 1912.
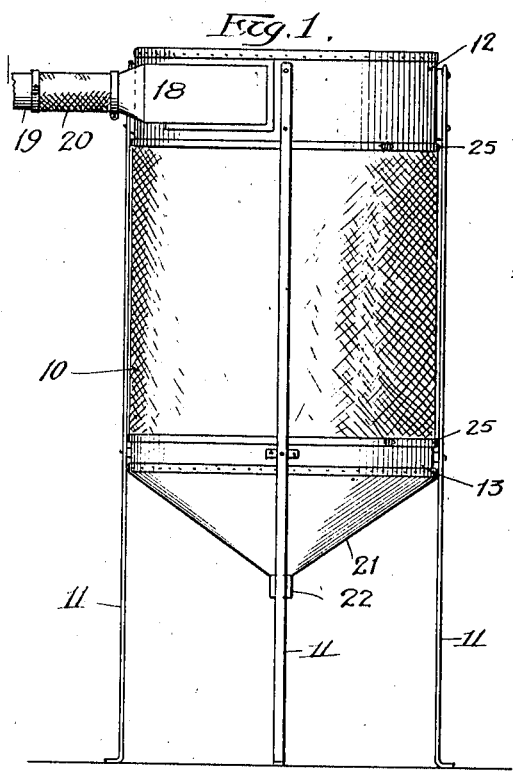
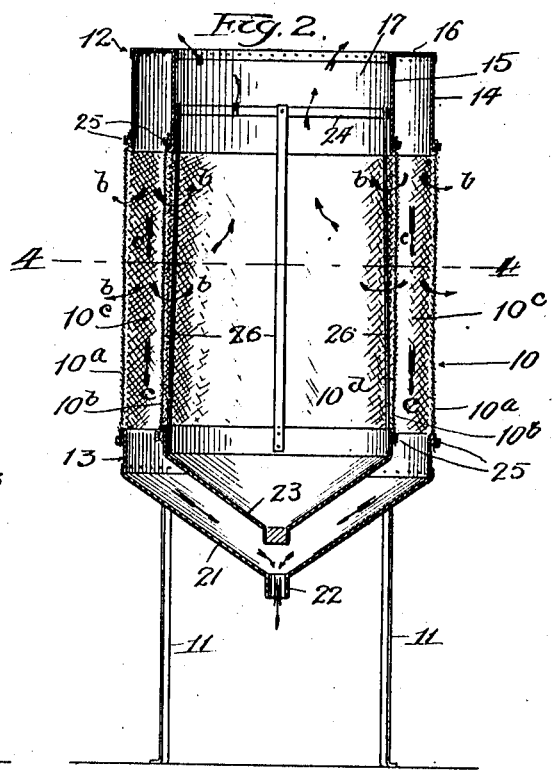
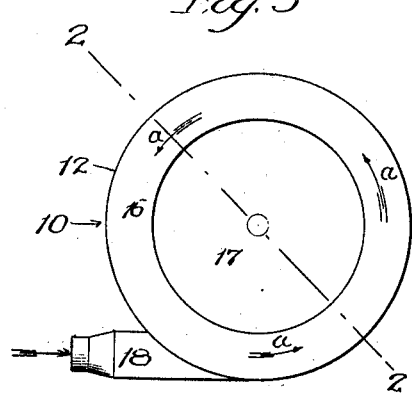
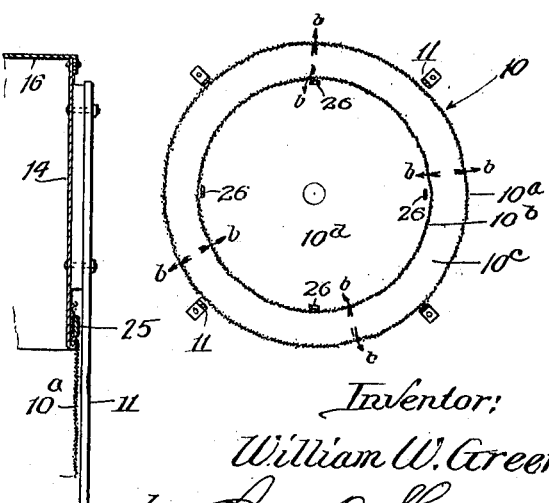
Witnesses:
Fannie F. Richards
Nels J. Holter
Inventor:
William W. Green,
by Charles O. Hurvey
his Attorney.

UNITED STATES PATENT OFFICE.

WILLIAM W. GREEN, OF NILES, MICHIGAN, ASSIGNOR TO GARDEN CITY FAN COMPANY, OF CHICAGO, ILLINOIS, A CORPORATION OF ILLINOIS.

APPARATUS FOR COLLECTING DUST AND OTHER FINE PARTICLES.

1,035,822.  Specification of Letters Patent.  Patented Aug. 13, 1912.

Application filed August 18, 1911. Serial No. 644,738.

*To all whom it may concern:*

Be it known that I, WILLIAM W. GREEN, a citizen of the United States, residing at Niles, in the county of Berrien and State of Michigan, have invented new and useful Improvements in Apparatus for Collecting Dust and other Fine Particles, of which the following is a specification.

This invention relates to apparatus for collecting dust and other fine particles, and has for its main object to provide an improved apparatus, capable of collecting practically all of the dust or other particles, carried in suspension in the air delivered to the apparatus.

Another object is to provide an apparatus wherein the incoming dust laden air is caused to readily escape from the collecting chamber of the structure in opposite directions, whereby a practically dead air space or quiet zone is left between the two currents of escaping air, in which space the dust or other particles fall and are freely discharged from the apparatus.

Other objects and advantages will appear in the course of this specification, and with all of said objects in view, this invention consists in a collector for dust and other particles, having a plurality of porous separating walls or screens, of large area, as compared with the area of the inlet opening of the apparatus, and arranged in such relation to each other that the escaping air is caused to flow directly to the outer atmosphere through said walls and in opposite directions to leave a comparatively quiet zone or dead air space therebetween, through which the dust or other particles are free to fall and be discharged from the apparatus.

The invention further consists in the several novel features of construction, arrangement and combinations of parts hereinafter described and claimed.

The invention is clearly illustrated in the drawing furnished herewith in which:

Figure 1 is a side elevation of an apparatus embodying one form of my present invention, Fig. 2 is a central, longitudinal section thereof, taken on line 2—2 Fig. 3, Fig. 3 is a plan of the apparatus, Fig. 4 is a horizontal section taken on line 4—4 Fig. 2, and Fig. 5 is a detail longitudinal section taken at the upper end of the apparatus.

In carrying out my invention, I provide a collecting chamber into which the air, laden with dust or other fine particles, is delivered, said chamber having a plurality of porous separating walls opening directly to the outer atmosphere and through which the air escapes, each of large area as compared with the inlet to the apparatus, and arranged in such manner that the escaping air may pass out in opposite directions at approximately atmospheric pressure to leave a quiet zone or dead air space therebetween. An inlet is provided for the dust laden air, and a discharge orifice is provided for the discharge of the particles that are collected in the apparatus.

Referring now more particularly to the form illustrated in the drawing furnished herewith, the body 10, of the collector is shown of cylindrical form, arranged in an upright manner, and carried by legs 11, secured thereto at top and bottom. The body of the collector comprises two separating walls $10^a$, $10^b$, for separating the dust or other fine particles from the escaping air, the wall $10^b$, being arranged within the wall $10^a$, and spaced therefrom to leave a collecting chamber $10^c$, into which the dust laden air is delivered. The walls $10^a$, $10^b$, are of porous formation and may comprise cloth, or other reticulated fabric, perforated material or the like, through which air may freely pass. It is preferred to make said walls of comparatively fine mesh material so as to prevent escape therethrough of the material to be collected by the apparatus. The intake end of the chamber is closed by a head 12, preferably of solid material, such as sheet metal, that joins the two walls $10^a$, $10^b$, and the discharge end is closed by an piece 13, preferably formed with an inverted hollow cone-shaped bottom 21, terminating in a discharge spout 22. An inner end piece 23, is secured to the end of the inner wall $10^b$, adjacent the end piece 13, and is spaced therefrom to permit the escape of collected material through the spout. The head 12, is preferably annular and formed of an outer solid wall 14, an inner solid wall 15, and a ring 16, connecting the inner and outer walls at their upper ends. The separating walls are shown as connected to the head and end pieces by hoops 25, that pass around the ends of the separating walls. The separating walls, head, end pieces and annular chamber 10ᵉ, surround a hollow space 10ᵈ, opening out of the body 10, through an opening 17, at the receiving end and said space 10ᵈ, affords a free escape for the air passing through the wall 10ᵇ.

The intake 18, opens directly into the head 12, and is arranged tangential therewith so that the incoming dust laden air, is given a tangential or cyclonic movement in entering the chamber 10ᶜ. The delivery pipe 19, is preferably connected with the intake 18, by a flexible connection 20, and said delivery pipe leads back to the place or places from which the dust or other particles are gathered, a fan or blower being interposed in said pipe, in accordance with the common practice, for coneying the dust or other fine particles to the collecting apparatus.

It is desirable to steady the lower end of the inner wall 10ᵇ, and end piece 23, and I have provided strips 26, secured to the end piece 23, that extend up on the inner side of the wall 10ᵇ, to ring 24, lying within the inner wall 15, of the head 12.

In operation, the fan or blower is started, and air, laden with the material to be collected, blown into the separating chamber 10ᶜ, of the apparatus. The air and matter held in suspension therein, upon entering said chamber first moves circumferentially through the intake end of said chamber, as indicated by the arrows a, losing most of its velocity as it fills the chamber, after which the air flows out through the inner and outer walls 10ᵃ, 10ᵇ, in the directions indicated by the arrows b, practically dividing midway between the walls and moving in opposite directions, leaving a dead air space or quiet zone midway between the inner and outer walls, through which the collected material falls, as indicated by the arrows c, lodging upon the discharging end piece 21, and passing out through the discharge spout 22. By reason of the large area of the separating walls 10ᵃ, 10ᵇ, as compared with the area of the inlet 18, and by the further reason that the separating walls are so arranged that the escaping air parts or divides, as it were, and flows directly out to the outer atmisphere in opposite directions, leaving a practically quiet zone therebetween, very little, if any, of the material lodges upon said walls, thereby preventing the pores or interstices therein from becoming clogged with the material. If some small portion of the material does lodge upon said walls, it is immediately jarred off because in operation the entire apparatus is in a state of constant quiver or vibration, caused by the fluctuation of the incoming air, the body 10, being supported by the slender legs 11, and having the flexible connection with the delivery pipe 19.

In my experiments I have found that the apparatus successfully collects the finest of particles, dust and other dust like materials, without any perceptible loss of the material.

I realize that various alterations and modifications of this device are possible without departing from the spirit of my invention, and I do not therefore desire to limit myself to the exact form of construction shown and described.

I claim as new and desire to secure by Letters Patent:

1. An apparatus of the class described, comprising a collecting chamber, contained within a plurality of spaced porous walls, each exposed directly to the outer atmosphere, and through which walls escaping air freely passes in opposite directions to leave a substantially quiet zone therebetween, said chamber having an inlet for directing the inflow between said walls.

2. An apparatus of the class described, comprising an annular collecting chamber contained within a plurality of porous walls opening directly to the outer atmosphere and through which walls escaping air passes in opposite directions, said chamber having a tangential dust inlet for directing the inflow between said walls.

3. An apparatus of the class described, comprising a collecting chamber having an inlet opening for dust laden air, and a discharge opening for the dust, and having porous walls inclosing said chamber on both of its sides, the area of said porous walls being large as compared with the area of the inlet opening, and the walls being arranged parallel with each other and opening directly from said chamber to the outer atmosphere, whereby air is free to escape therefrom in opposite directions from said chamber to leave a quiet zone midway between said walls.

4. An apparatus of the class described, comprising an inner wall, and an outer wall surrounding said inner wall, both walls inclosing an endless collecting chamber and having oppositely arranged portions formed on reticulated fabric exposed directly to the outer atmosphere and through which air may escape in opposite directions from said chamber, said chamber having an inlet opening for directing the inflow of dust laden air between said walls and having a discharge opening for the dust.

5. An apparatus of the class described, comprising an inner cylindrical wall, and an outer cylindrical wall surrounding said inner wall and forming therebetween an annular collecting chamber, said walls having oppositely arranged portions formed on reticulated fabric exposed directly to the outer atmosphere and through which walls air may escape in opposite directions, said chamber having an inlet opening for directing the inflow of dust laden air between the walls and having a discharge opening for the dust.

6. An apparatus of the class described, comprising an inner wall and an outer wall surrounding said inner wall and forming therebetween an endless collecting chamber, said walls having oppositely arranged porous portions exposed directly to the outer atmosphere and through which walls air may escape in opposite directions to leave a quiet zone, said chamber having an inlet opening for dust laden air at one end and dust discharge openings at the other end.

7. An apparatus of the class described, comprising an inner porous cylindrical wall, and an outer porous, cylindrical wall surrounding said inner wall, forming therebetween an endless collecting passage, from which escaping air may pass in opposite directions through said walls, an annular receiving conduit joined to said porous walls at the receiving end, and having an inlet arranged tangential therewith, and inner and outer end pieces joining said walls at the discharge end, said outer end piece having a continuously open discharge orifice.

8. An apparatus of the class described, comprising an endless collecting chamber, having a dust and air inlet opening and a dust discharge opening, and contained within porous walls opening directly to the outer atmosphere to permit the escape of air from said chamber in opposite directions whereby a dead air space or quiet zone is left between said walls through which space collected matter is free to pass.

9. An apparatus of the class described, comprising an inner tubular porous wall, an outer porous wall surrounding said inner wall, and spaced therefrom to leave an endless passage therebetween, said walls being exposed directly to the outer atmosphere whereby air is free to escape directly to the atmosphere in opposite directions, an annular head joined to said walls at the intake end and arranged to receive the impact of incoming dust laden air, said head having an inlet, opening tangentially into said head, and inner and outer spaced end pieces joining said walls at the discharge end.

10. An apparatus of the class described, comprising an inner tubular wall, an outer wall surrounding and spaced away from said inner wall to form between said walls an endless collecting chamber, said walls having porous portions bounding the sides of said chamber, through which escaping air may pass direct to the outer atmosphere in opposite directions, said chamber having an inlet, opening tangentially into said chamber at one end, and having a discharge orifice at the other end, and means for holding said porous portions of said walls in a substantially taut condition.

11. In an apparatus of the class described, a pair of tubular, porous walls, each exposed directly to the outer atmosphere and one arranged within the other and forming therebetween an endless collecting chamber, from which air may escape through said walls in opposite directions to leave a dead air space or quiet zone midway between said walls.

12. An apparatus of the class described, comprising an inner, upright, porous, tubular wall, an outer, upright, porous, tubular wall, spaced therefrom and surrounding the inner wall to form an endless collecting chamber therebetween, each of said walls being exposed directly to the outer atmosphere, an annular head joining said walls at the upper end and having an inlet arranged tangential therewith, spaced end pieces joined to and inclosing the lower end of said collecting chamber, and one of said end pieces having a discharge orifice.

13. In an apparatus of the class described, an annular collecting chamber, having spaced inclosing walls exposed directly to the outer atmosphere and formed with oppositely arranged portions, constructed of reticulated fabric, through the interstices of which air may escape in opposite directions from a plane midway between said walls to leave a quiet zone at said plane, substantially as and for the purpose set forth.

In witness whereof, I have hereunto subscribed my name at Chicago, Cook county, Illinois, this 12th day of August 1911.

WILLIAM W. GREEN.

Witnesses:
T. J. FLANAGAN,
R. F. LINDEMAN.